United States Patent Office 3,321,461
Patented May 23, 1967

3,321,461
PROCESS FOR PREPARING O- AND
N-SUBSTITUTED GLYCOSIDES
Konoshin Onodera and Shigehiro Hirano, Kyoto, Japan, assignors to Asaki Kasei Kogyo Kabushiki Kaisha, Osaka, Japan, a corporation of Japan
No Drawing. Filed Oct. 6, 1964, Ser. No. 401,988
Claims priority, application Japan, Oct. 7, 1963, 38/52,462
12 Claims. (Cl. 260—210)

The present invention relates to a process for preparing O-substituted glycosides by reacting monosaccharides with compounds containing hydroxyl groups in the presence of polyphosphoric acid.

The present invention also relates to a process for preparing N-substituted glycosides by reacting monosaccharides with compounds containing an amino group in the presence of polyphosphoric acid.

Up to the present time, several methods have been attempted for preparing O- and N-substituted glycosides. These methods, however, have great difficulty to be applied commercially, because they involve complex processes with poor yield. Recently, G. Schramm et al. (Angew. Chem., 74, 53–59 (1962)) reported a method for preparing O- and N-substituted glycosides by reacting monosaccharides and compounds containing a hydroxyl or an amino group in the presence of ethyl ester of polyphosphoric acid. In this case, the reaction was effected in dimethyl formamide containing hydrogen chloride.

We, the inventors of the present invention have attempted to develop an improved practical simple method and to reduce the production-cost of glycosides. In the course of research work, we have discovered that polyphosphoric acid which is cheaper than ethyl ester of polyphosphoric acid produces better yield than the ethyl ester of polyphosphoric acid without adding any solvents.

In carrying out the present invention polyphosphoric acid (about 3% of the total amounts of reactants) is added to the mixture of monosaccharides and the compounds containing hydroxyl or amino groups. Then, the reaction mixture is kept at fused temperature for 30–60 minutes. In the case that the melting point of a glycone is high, the amounts of polyphosphoric acid used should be two or three times as much as the total amount of reactants, because it works not only as a catalyst, but also as a solvent. After the reaction is completed, the reactant is cooled, and the product precipitated is collected as a pure crystal. When the crystal contains impure compounds such as raw materials and decomposed materials, recrystallization with methanol is effective to obtain a pure product.

The carbohydrates applied in the present invention are xylose, ribose, arabinose, glucose, mannose, their uronic acid esters and their lactones. As the compounds containing a hydroxyl group, phenol is commonly used. As the compounds containing an amino group, aniline and toluidine are used. Other than these syntheses of simple O- and N-substituted glycosides, N-substituted glycosides derived from theophylline, adenine, guanine, hypoxanthine are also obtained by applying the present invention, and they are used not only as biochemically or pharmaceutically important compounds, but also as food fiavors such as sodium 5'-inosinate, and sodium of 5'-guanylate.

The reaction temperature and time depend upon the reactants, usually the most suitable reaction occurs when the reaction is effected at the fused temperature of the reactants for 30–60 minutes without adding any solvents.

As mentioned above, the present invention is directed to methods for preparing O- and N-glycosides and is superior to the conventional methods in the following respects.

(1) The process is simple and the yield of products is excellent.

(2) The reaction can be done without adding any solvents.

(3) Polyphosphoric acid used as a catalyst is inexpensive and is commercially available.

(4) The reaction is completed in a short period of time such as 30–60 minutes.

(5) The method to isolate products is simple.

Example 1

To a mixture of 3.02 grams of 1,2,5-tri-O-acetyl-$\beta$-D-glucurono-6,3-lactone and 1.14 grams of phenol fused at 110° C., 0.13 gram of polyphosphoric acid is added and the reaction is continued for 40 minutes. After the reaction is completed, the product cooled is dissolved with 50 ml. of hot methanol, then cooled again. The collection of crystal precipitated affords 2.75 grams of O-phenyl 2,5-di-O-acetyl-$\beta$-D-glycofurano-6,3-lactone (yield 82%). M.P. 190°–192° C., $[\alpha]_D^{14}$ +75° (in CHCl$_3$).

Analysis.—Calcd. for $C_{16}H_{16}O_8$: C, 57.16%; H, 4.80%. Found: C, 57.14%; H, 4.84%.

Example 2

Treatment of 3.76 grams of methyl 1,2,3,4-tetra-O-acetyl-$\alpha$-D-galacturonide with 1.14 grams of phenol in the presence of 0.15 gram of polyphosphoric acid exactly as in Example 1 gave 3.4 grams of O-phenyl 2,3,4-tri-O-acetyl-$\alpha$-D-galacturonide methyl ester (yield 83%). M.P. 161°–162° C., $[\alpha]_D^{14}$ +17° (in CHCl$_3$).

Analysis.—Calcd. for $C_{19}H_{22}O_{10}$: C, 55.61%; H, 5.40%. Found: C, 55.31%; H, 5.45%.

Example 3

Treatment of 3.9 grams of 1,2,3,4,6-penta-O-acetyl-$\beta$-D-glucose with 1.14 grams of phenol in the presence of 0.15 gram of polyphosphoric acid exactly as in Example 1 gave 3.24 grams of O-phenyl 2,3,4-tri-O-acetyl-$\beta$-D-glucuronide methyl ester (yield 79%). M.P. 126°–128° C., $[\alpha]_D^{14}$ −36° (in CHCl$_3$).

Analysis.—Calcd. for $C_{19}H_{22}O_{10}$: C, 55.61%; H, 5.40%. Found: C, 55.56%; H, 5.43%.

Example 4

Treatment of 3.9 grams of 1,2,3,4,6-penta-O-acetyl-$\beta$-D-glucose with 1.14 grams of phenol at 80° C. for 30 minutes in the presence of 0.15 gram of polyphosphoric acid exactly as in Example 1 gave 3.21 grams of O-phenyl 2,3,4,6-tetra-O-acetyl-$\beta$-D-glucoside (yield 76%). M.P. 124° C., $[\alpha]_D^{14}$ −21° (in CHCl$_3$).

Analysis.—Calcd. for $C_{20}H_{24}O_{10}$: C, 56.60%; H, 5.70%. Found: C, 56.33%; H, 5.78%.

Example 5

Treatment of 3.38 grams of 1,2,3,4-tetra-O-acetyl-$\alpha$-L-rhamnose with 1.14 grams of phenol in the presence of 0.14 gram of polyphosphoric acid exactly as in Example 1 gave 2.98 grams of O-phenyl 2,3,4-tri-O-acetyl-$\alpha$-L-rhamoside (yield 80%). M.P. 129°–130° C., $[\alpha]_D^{25}$ −61° (in CHCl$_3$).

Analysis.—Calcd. for $C_{18}H_{22}O_8$: C, 59.01%; H, 6.05%. Found: C, 59.25%; H, 6.19%.

Example 6

Treatment of 3.6 grams of $\beta$-D-glucose with 2.28 grams of phenol in the presence of 0.18 gram of polyphosphoric acid at 120° C. for 3 hours exactly as in Example 1 gave 3.2 grams of O-phenyl $\alpha$-D-glucoside (yield 63%). M.P. 173°–174° C., $[\alpha]_D^{20}$ −72° (in H$_2$O).

Example 7

Treatment of 3.9 grams of 1,2,3,4,6-penta-O-acetyl-β-D-glucose with 1.11 grams of aniline at 140° C. for 20 minutes in the presence of 0.15 gram of polyphosphoric acid exactly as in Example 1 gave 2.33 grams of N-phenyl 2,3,4,6-tetra-O-acetyl-α-D-glucosylamine (yield 55%). M.P. 143° C., $[\alpha]_D^{14}$ +196° (in $CHCl_3$).

*Analysis.*—Calcd. for $C_{20}H_4O_9N$: C, 56.86%; H, 5.72%; N, 3.31%. Found: C, 56.85%; H, 6.00%; N, 3.46%.

Example 8

Treatment of 3.9 grams of 1,2,3,4,6-penta-O-acetyl-β-D-glucose with 1.29 grams of toluidine at 110°–120° C. for 25 minutes in the presence of 0.16 gram of polyphosphoric acid exactly as in Example 1 gave 3.06 grams of N-p-tolyl 2,3,4,6-tetra-O-acetyl-β-glucosylamine (yield 70%). M.P. 143°–144° C., $[\alpha]_D^{14}$ −23° (in $CHCl_3$).

*Analysis.*—Calcd. for $C_{21}H_{27}O_7N$: C, 57.66%; H, 6.22%; N, 3.20%. Found: C, 57.78%; H, 6.24%; N, 3.06%.

Example 9

Treatment of 3.9 grams of 1,2,3,4,6-penta-O-acetyl-β-D-glucose with 2.3 grams of theophylline at 140° C. for 45 minutes in the presence of 0.18 gram of polyphosphoric acid exactly as in Example 1 gave 4.23 grams of 7N - (2,3,4,6 - tetra - O - acetyl - β - D - glucopyranosyl)-theophylline [I] (yield 83%). M.P. 147°–148° C., $[\alpha]_D^{14}$ −6° (in $CHCl_3$).

*Analysis.*—Calcd. for $C_{21}H_{26}O_{11}N_4$: C, 49.41%; H, 5.13%; N, 10.97%. Found: C, 49.39%; H, 5.19%; N, 10.72%.

Deacetylation of [I] with methanol containing ammonia gave 2.70 grams of 7N-β-D-glucopyranosyl theophylline (yield 95%). M.P. 261° C., $[\alpha]_D^{14}$ +38° (in $H_2O$).

*Analysis.*—Calcd. for $C_{13}H_{18}O_7N_{14}$: C, 46.61%; H, 5.30%; N, 16.37%. Found: C, 45.55%; H, 5.36%; N, 16.18%.

Example 10

Treatment of 3.18 grams of 1,2,3,4-tetra-O-acetyl-β-D-xylose with 2.3 grams of theophylline in the presence of 0.15 gram of polyphosphoric acid, followed by deacetylation exactly as in Example 9 gave 1.38 grams 7N-β-D-xylopyranosyl theophylline (yield 43%). M.P. 254° C., $[\alpha]_D^{18}$ −26° (in $H_2O$).

Example 11

Treatment of 3.18 grams of 1,2,3,4-tetra-O-acetyl-β-D-ribose with 2.3 grams of theophylline in the presence of 0.15 gram of polyphosphoric acid, followed by deacetylation exactly as in Example 9 gave 1.09 grams of 7N-β-D-ribopyranosyl theophylline (yield 35%). M.P. 169° C., $[\alpha]_D^{18}$ +39° (in $H_2O$).

Example 12

Treatment of 2.4 grams of 1,2,3,4,6-penta-O-acetyl-β-D-glucose with 1.8 grams of 6-benzamide purine in the presence of 0.12 gram of polyphosphoric acid, followed by deacetylation exactly as in Example 9 gave 0.74 gram of 9-β-D-glucopyranosyl adenine (yield 25%). M.P. 205° C., $[\alpha]_D^{20}$ −7° (in $H_2O$).

Example 13

Treatment of 3.18 grams of 1,2,3,5-tetra-O-acetyl-β-D-ribose with 2.14 grams of 6-acetyl-hypoxanthine in the presence of 0.16 gram of polyphosphoric acid, followed by deacetylation exactly as in Example 9 gave 1.4 grams of inosine (yield 52%). M.P. 218° C., $[\alpha]_D^{20}$ −48° (in $H_2O$).

Example 14

Treatment of 3.18 grams 1,2,3,5-tetra-O-acetyl-β-D-ribose with 2.35 grams of 2-N, 6-O-acetyl guanine in the presence of 0.17 gram of polyphosphoric acid, followed by deacetylation exactly as in Example 9 gave 1.7 grams of guanosine (yield 60%). M.P. 239° C., $[\alpha]_D^{20}$ −71° (in $H_2O$).

What we claim is:

1. A process for preparing O-substituted glucoside comprising condensing a carbohydrate selected from the group consisting of pentose, hexose and acyl derivatives thereof with an aromatic alcohol in the presence of polyphosphoric acid.

2. A process for preparing N-substituted glucoside comprising condensing a carbohydrate selected from the group consisting of pentose, hexose and acyl derivatives thereof with an aromatic amine in the presence of polyphosphoric acid.

3. A process for preparing N-substituted glucoside comprising condensing a carbohydrate selected from the group consisting of pentose, hexose and acyl derivatives thereof with one of purine bases in the presence of polyphosphoric acid.

4. A process according to claim 1 wherein the aromatic alcohol is phenol.

5. A process according to claim 1 wherein the carbohydrate is selected from the group consisting of glucose, galactose, mannose, xylose, arabinose, ribose, rhamnose and acyl derivatives thereof.

6. A process according to claim 2 wherein the carbohydrate is selected from the group consisting of glucose, galactose, mannose, xylose, arabinose, ribose, rhamnose and acyl derivatives thereof.

7. A process according to claim 3 wherein the carbohydrate is selected from the group consisting of glucose, galactose, mannose, xylose, arabinose, ribose, rhamnose and acyl derivatives thereof.

8. A process according to claim 2 wherein the aromatic amine is selected from the group consisting of aniline and toluidine.

9. A process according to claim 3 wherein the purine bases are acetyl or benzyl derivatives of adenine, hypoxanthine and guanine.

10. A process according to claim 1 wherein the condensation is effected at a fusing temperature for 30 to 60 minutes.

11. A process according to claim 2 wherein the condensation is effected at a fusing temperature for 30 to 60 minutes.

12. A process according to claim 3 wherein the condensation is effected at a fusing temperature for 30 to 60 minutes.

References Cited by the Examiner

UNITED STATES PATENTS

| | | | |
|---|---|---|---|
| 2,606,186 | 8/1952 | Dean et al. | 260—210 |
| 2,830,984 | 4/1958 | Baker et al. | 260—211.5 |
| 3,152,115 | 10/1964 | Morel et al. | 260—210 |
| 3,208,997 | 9/1965 | Iwai et al. | 260—211.5 |

FOREIGN PATENTS 728,688   4/1955   Great Britain.

OTHER REFERENCES

Schramm et al.: "Angew. Chem.," vol. 74, 1962, pp. 53–59.

LEWIS GOTTS, *Primary Examiner.*

JOHNNIE R. BROWN, *Assistant Examiner.*

UNITED STATES PATENT OFFICE
CERTIFICATE OF CORRECTION

Patent No. 3,321,461                         May 23, 1967

Konoshin Onodera et al.

It is hereby certified that error appears in the above numbered patent requiring correction and that the said Letters Patent should read as corrected below.

In the heading to the printed specification, line 5, for "Asaki Kasei Kogyo Kabushiki Kaisha" read -- Asahi Kasei Kogyo Kabushiki Kaisha --.

Signed and sealed this 22nd day of October 1968.

(SEAL)
Attest:

Edward M. Fletcher, Jr.

Attesting Officer

EDWARD J. BRENNER

Commissioner of Patents